United States Patent [19]

Bostock et al.

[11] Patent Number: 4,543,924
[45] Date of Patent: Oct. 1, 1985

[54] REDUCTION OF CRANKSHAFT NOISE FROM AN INTERNAL COMBUSTION ENGINE

[75] Inventors: Philip G. Bostock, Benfleet; Graham J. Holland, Canvey Island, both of England

[73] Assignee: Ford Motor Company, Dearborn, Mich.

[21] Appl. No.: 592,974

[22] Filed: Mar. 23, 1984

[30] Foreign Application Priority Data

Apr. 13, 1983 [GB] United Kingdom ............ 8309942

[51] Int. Cl.⁴ .............................................. F16H 55/30
[52] U.S. Cl. ................................. 123/195 A; 474/161
[58] Field of Search .......... 123/195 R, 195 A, 195 C; 474/161, 273

[56] References Cited

U.S. PATENT DOCUMENTS

| | | | |
|---|---|---|---|
| 1,525,717 | 2/1925 | Butz | 74/574 |
| 1,646,897 | 11/1925 | Burns | 74/574 |
| 2,150,456 | 3/1939 | Perrine | 123/195 A |
| 2,724,377 | 11/1955 | Nallinger | 123/195 A |
| 2,911,962 | 11/1959 | McRae | 123/195 A |
| 2,945,482 | 7/1960 | McRae | 123/195 A |
| 4,332,574 | 6/1982 | Aoyama et al. | 474/161 |
| 4,348,199 | 9/1982 | Oonuma et al. | 474/161 |
| 4,467,753 | 8/1984 | Lange | 123/195 A |

FOREIGN PATENT DOCUMENTS 1352384 5/1974 United Kingdom .
1444747 8/1976 United Kingdom .

*Primary Examiner*—Craig R. Feinberg
*Attorney, Agent, or Firm*—Clifford L. Sadler; Robert E. McCollum

[57] ABSTRACT

Crankshaft noise from an internal combustion engine is reduced by the known step of using a crankshaft damper pulley 10 on the front end of the crankshaft. This damper pulley has a damper ring 16 interposed between the hub and the rim of the pulley. Noise is further reduced by fitting a plug 20 to the front of the engine to cover the area within the ring 16 of the damper pulley. The plug 20 is preferably of neoprene rubber.

4 Claims, 1 Drawing Figure

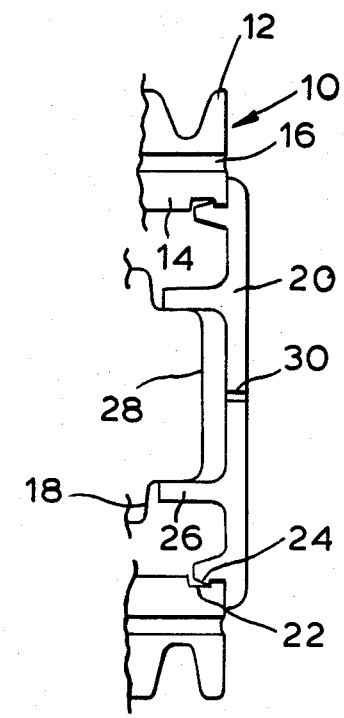

REDUCTION OF CRANKSHAFT NOISE FROM AN INTERNAL COMBUSTION ENGINE

This invention relates to a method of, and a plug for reducing crankshaft noise from an internal combustion engine. The invention is particularly concerned with diesel engines.

It is known to reduce crankshaft noise by modifying the pulley mounted on the front end of the crankshaft. The modification involves the inclusion of an annulus of noise attenuating material 10 (usually rubber) between the rim of the pulley and the hub. The annulus is fitted between the rim and the hub in such a way that it is capable of transmitting the necessary torsional loads, and this method is satisfactory in providing a reduction in crankshaft noise. The torsional, axial and lateral motion of the crankshaft is also modified. A pulley of this type is known as a crankshaft torsional vibration damper pulley, and in the rest of this specification will be referred to as a crankshaft damper pulley.

However it is desirable to still further reduce crankshaft noise.

According to the present there is provided a method of reducing crankshaft noise from an internal combustion engine which has a crankshaft damper pulley fitted to the front end of the crankshaft, the method comprising the step of fitting noise attenuating material at the front of the pulley to substantially cover the area within the noise attenuating annulus of the pulley.

The invention also provides a plug of noise attenuating material adapted to be fitted at the front of a crankshaft damper pulley on an internal combustion engine to substantially cover the area within the noise attenuating annulus of the pulley.

The invention further provides the combination of a crankshaft damper pulley and a plug of noise attenuating material, the pulley and the plug being adapted to mutually engage to hold the plug in place on the damper pulley so that it substantially covers the area within the noise attenuating annulus of the pulley.

The plug is preferably of neoprene rubber and preferably is a push fit onto the front of the pulley and/or onto the end of the front crankshaft centre bolt.

The invention will now be further described, by way of example, with reference to the accompanying drawing which shows a section through a crankshaft damper pulley to which a plug has been fitted.

In the drawing, the pulley 10 has a rim 12 and a hub 14. A rubber damper in the form of an annulus 16 is fitted between the hub and the rim. This provides a damping function which reduces noise radiation from the inside of the engine.

The pulley 10 is fitted on the front end of the engine crankshaft 18. A rubber plug 20 is fitted onto the front of the pulley 10, and the diameter of the plug is substantially equal to the internal diameter of the rubber annulus 16, so that it shields the hub 14 and the crankshaft end 18.

The pulley 10 is provided with an internal groove 22 and the plug 20 has corresponding lugs 24, so that the two can be snap-fitted together. The plug also has an internal rim 26 which locates on the front of the crankshaft centre bolt 28 to assist in holding the plug in place. A vent 30 may be provided in the centre of the plug to facilitate fitting by allowing the escape of air from beneath the plug.

The plug is moulded in neoprene rubber which is oil and heat resistant. The elasticity of the rubber gives the spring force which holds the lugs 24 in the groove 22 and acoustically seals the joint.

In one example on a York diesel engine, the plug 20 has a surface mass loading of 6 kg/m$^2$ which gives a noise reduction of 0.5 dBA from the front of the engine.

I claim:

1. A crankshaft pulley noise reducing means for an internal combustion engine having a pulley fixed for rotation with an engine crankshaft, the pulley having an outer rim and an annular hub joined by an elastic damper, the noise reducing means comprising a flexible elastic annular cover member of noise attenuating material engagable at its outer periphery with a side face of the hub and having means radially inwardly thereof engagable with and surrounding the end of the crankshaft to cover the noise attenuating area of the crankshaft pulley, wherein the cover member having retention means at its outer periphery to simultaneously engage both the side face of the pulley hub and an inner surface of the hub, the retention means being in the shape of a resilient hook, the hub inner surface having a recess therein for engagement by the hook to retain the cover member in place.

2. A noise reducing means as in claim 1 wherein the radially inward means engagable with the crankshaft end comprises a dish shaped portion projecting axially with respect to the crankshaft end from the member to frictionally surround and engage the end to cover the same.

3. A noise reducing means as in claim 1, including an air vent hole in the cover member.

4. A noise reducing means as in claim 1, wherein the noise attenuating material is neoprene rubber.

* * * * *